July 17, 1962 A. WENZEL 3,044,243
CROSS CONVEYER FOR PICK-UP BALER
Filed Oct. 13, 1958 6 Sheets-Sheet 1
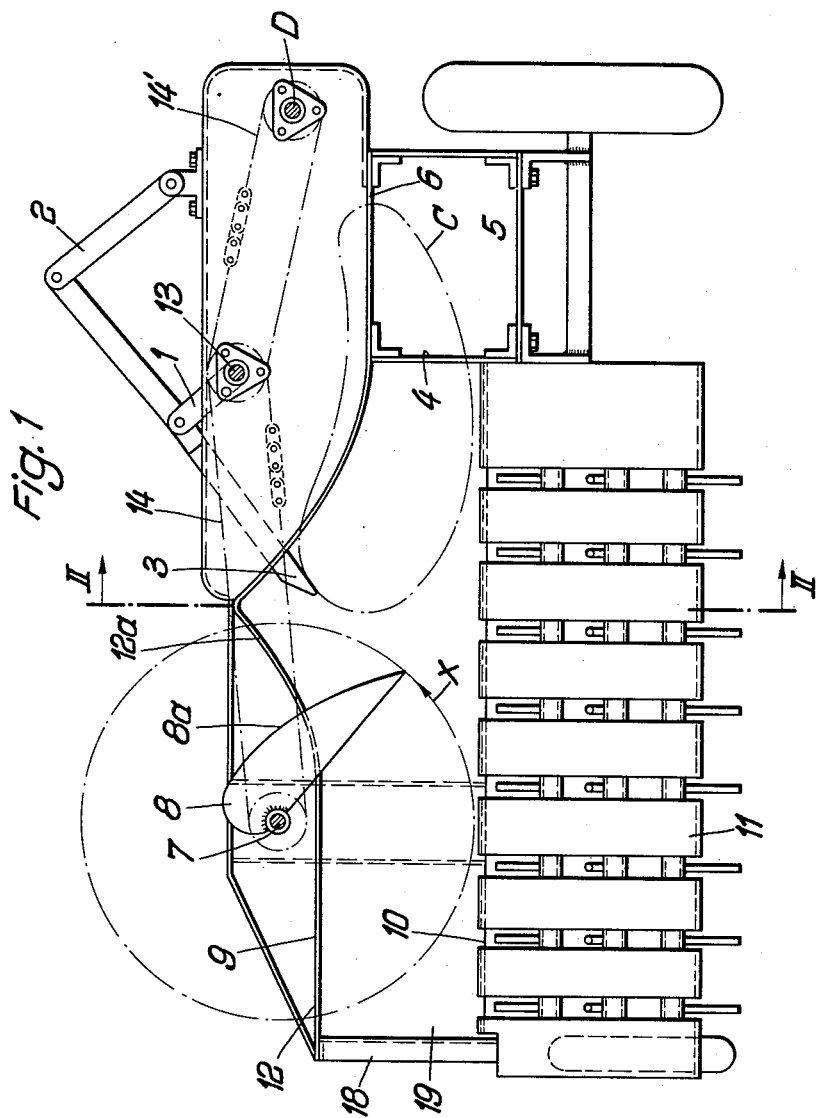
Inventor:
ALFRED WENZEL
by
Mestern & Kollin
ATTORNEYS

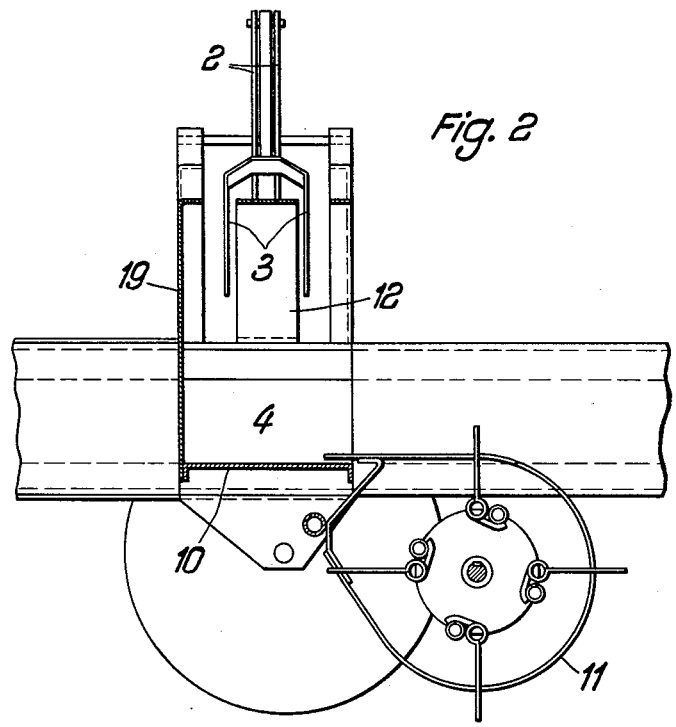
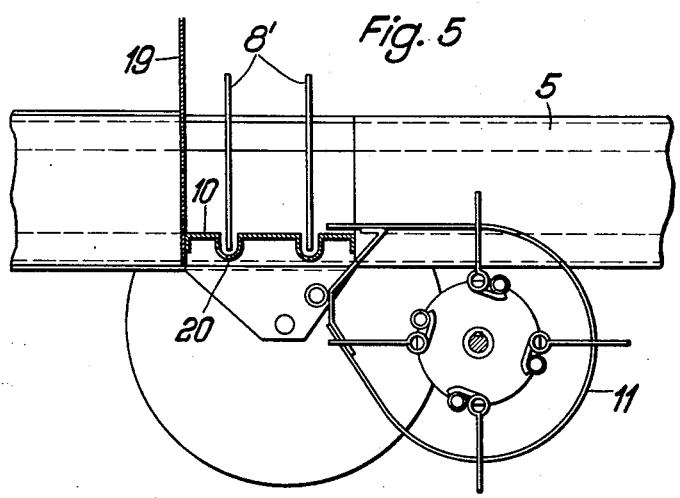

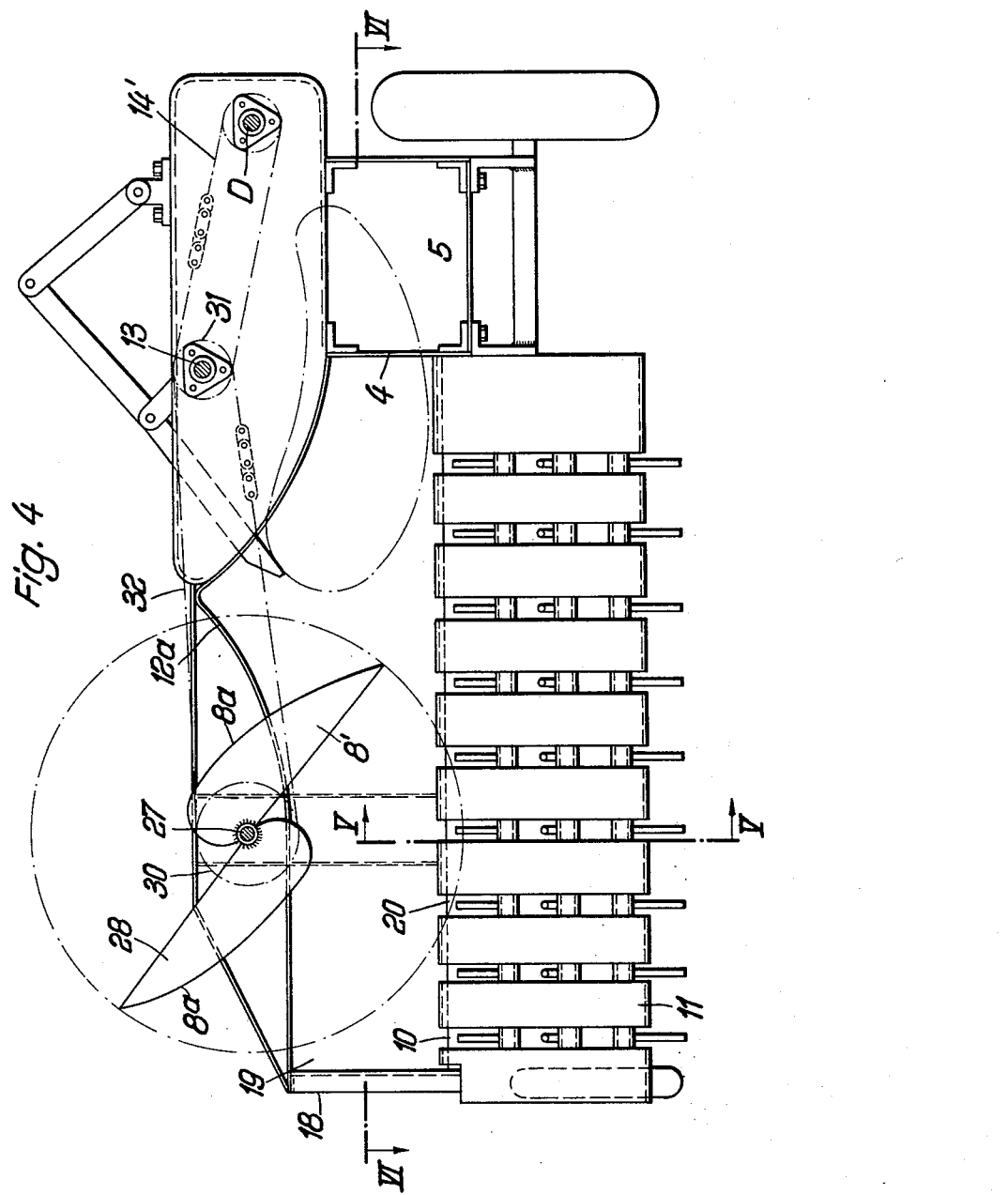

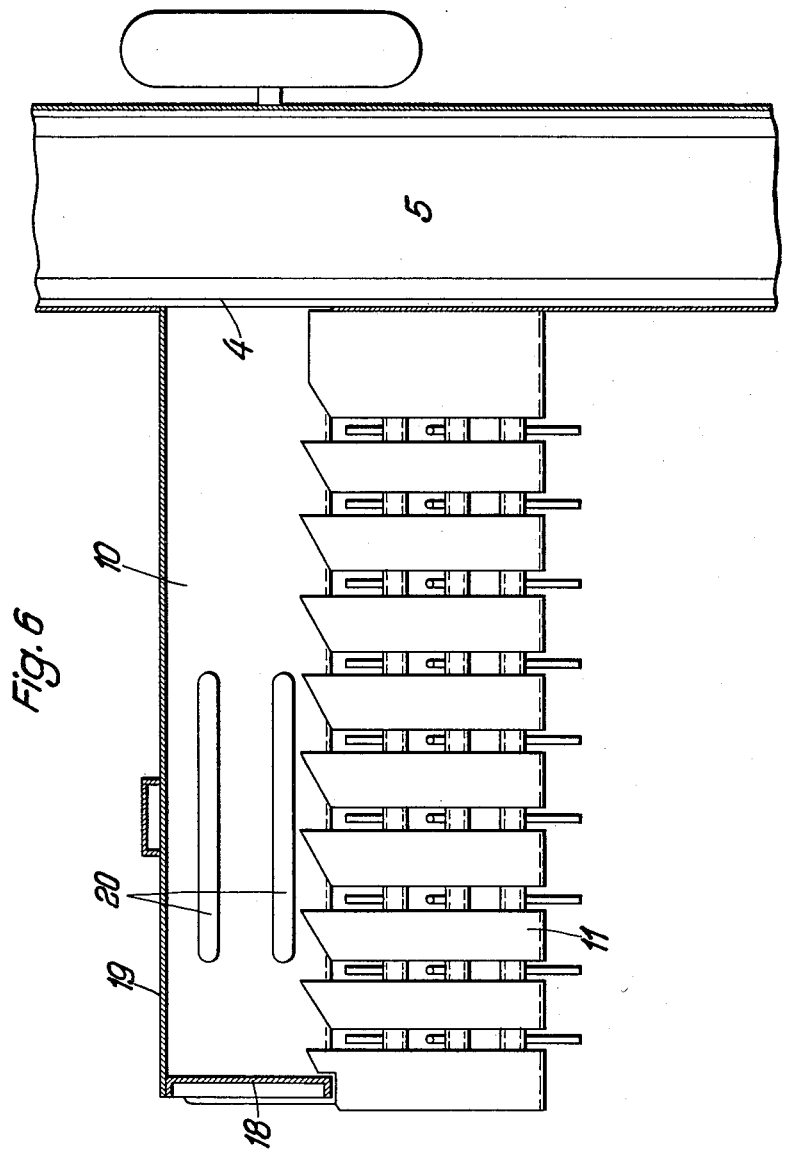

July 17, 1962  A. WENZEL  3,044,243
CROSS CONVEYER FOR PICK-UP BALER
Filed Oct. 13, 1958  6 Sheets-Sheet 6
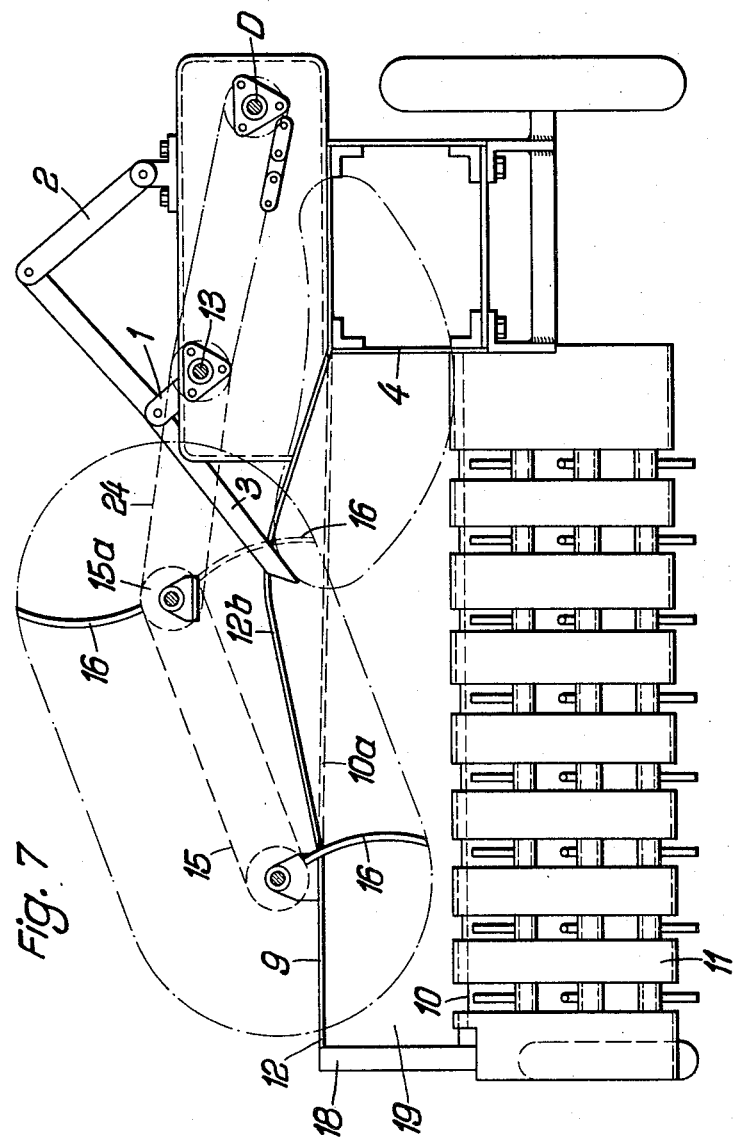
Inventor:
ALFRED WENZEL
by Mestern & Kollin
ATTORNEYS

United States Patent Office 3,044,243
Patented July 17, 1962

3,044,243
CROSS CONVEYER FOR PICK-UP BALER
Alfred Wenzel, Wolfenbuttel, Germany, assignor to Gebrüder Welger, Wolfenbuttel, Germany, a firm
Filed Oct. 13, 1958, Ser. No. 766,800
Claims priority, application Germany Oct. 16, 1957
7 Claims. (Cl. 56—341)

The present invention relates to improvements in mobile pick-up balers, and more particularly to a cross conveyer for such a baler.

A pick-up baler usually consists of a pick-up assembly which is adapted to pick up and lift the hay, straw or other material from the ground and then to deposit it upon a receiving table, a baling chamber extending laterally of the pick-up assembly in the direction of travel of the machine, a reciprocating plunger within the baling chamber, and a reciprocating packing mechanism which is movable along a curved path transverse to the direction of travel and adapted to convey the material from the receiving table into the baling chamber through a lateral opening therein, so that it may then be compressed in such chamber by the baling plunger to form bales which are finally strapped with cord or wire. The reciprocating packing mechanism usually consists of conveying fingers which are driven by a constantly revolving crank and the movement of which is controlled by an arm which is pivotably mounted in a stationary position on the machine frame. In their travel along a curved path, these conveying fingers move laterally into the baling chamber and then out of it in the upward direction and back to their original position by passing through suitable slots in the upper walls of the chamber. Such a packing mechanism which swings back and forth in a cycle in accordance with the reciprocating movement of the plunger in the baling chamber, may be made of a very solid construction without fear that its operation will affect the chassis of the machine. It produces a preliminary compression of the harvest material and also pushes and packs the same in a direction toward the upper corner of the baling chamber opposite to the lateral filling opening where vacant spots are most liable to occur.

The only disadvantage of the known packing mechanism of this type is that the conveying fingers thereof cannot travel along the entire length of the receiving table upon which the material is deposited by the pick-up mechanism, but that an additional cross conveyer is required for pushing the material along the receiving table to a point within the reach of the conveying fingers of the packing mechanism.

The cross conveyers known for this purpose have certain very serious disadvantages, among them the fact that they require rather expensive driving means, such as bevel gears or the like, and often also special control means for withdrawing the conveying fingers from the material prior to the return stroke thereof.

It is an object of the present invention to provide a cross conveyer which is especially adapted to cooperate with a packing mechanism of the mentioned type and which is designed to overcome the disadvantages of similar conveyers as were previously known.

An important feature of the new cross conveyer consists in the provision of a mechanism which is adapted to move the conveying fingers thereof above the receiving table within the plane of movement of the conveying fingers of the packing mechanism or within a plane parallel thereto, and in the provision of suitable means for stripping the material off the conveying fingers of the cross conveyer at the end of the working stroke thereof without requiring any control cams or other control means to withdraw these fingers from the conveyed material.

Further objects, features, and advantages of the present invention will be apparent from the following detailed description thereof, particularly when read with reference to the accompanying drawings, in which—

FIGURE 1 shows a front view of a pick-up baler which is equipped with a cross conveyer forming one embodiment of the present invention;

FIGURE 2 shows a cross section taken along line II—II of FIGURE 1;

FIGURE 4 shows a front view of a pick-up baler which is equipped with a cross conveyer according to a modification of the invention;

FIGURE 5 shows a cross section taken along line V—V of FIGURE 4;

FIGURE 6 shows a cross section taken along line VI—VI of FIGURE 4; while

FIGURE 7 shows a front view of a pick-up baler with a cross conveyer according to a further modification of the invention.

Figure 3:
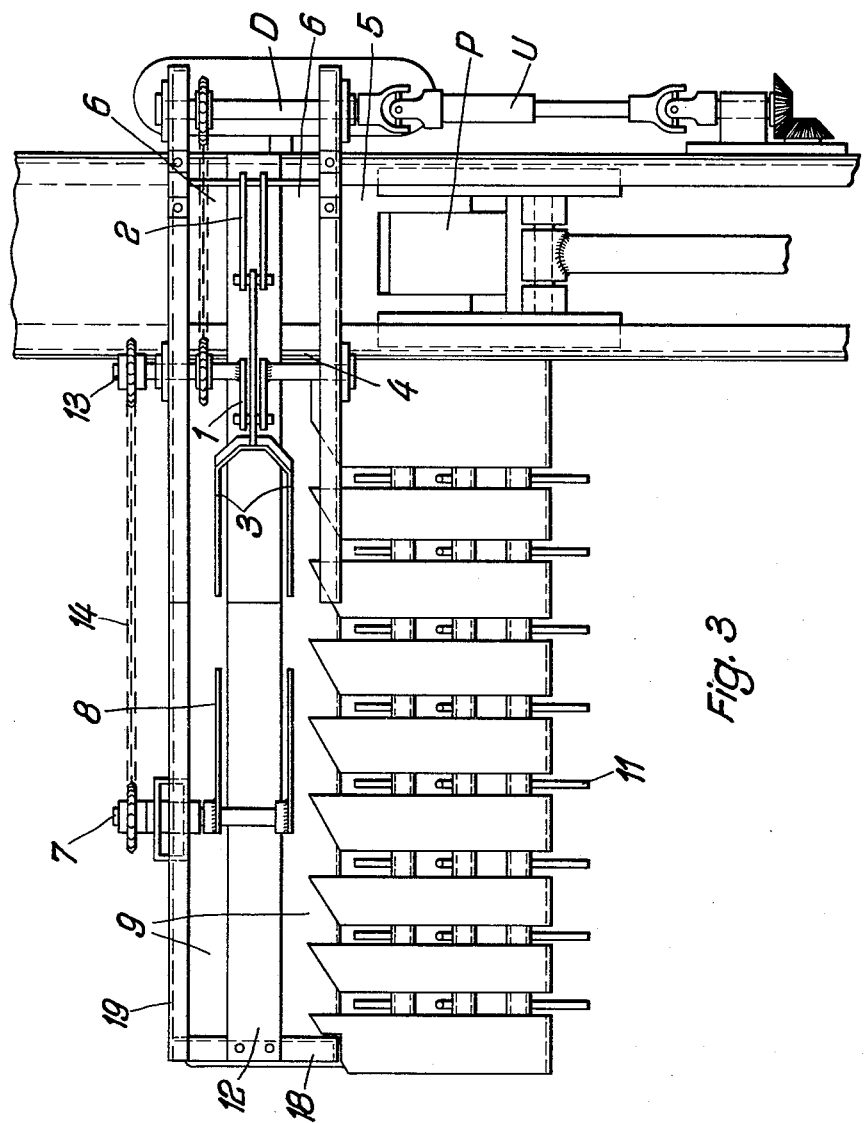
FIGURE 3 shows a plan view of the pick-up baler and cross conveyer according to FIGURE 1.

The three different embodiments of the present invention as shown in FIGURES 1 to 3, 4 to 6, and 7 respectively all illustrate the same pick-up baler of a conventional construction which is provided with a likewise conventional packing mechanism mounted on the upper wall of the baling chamber 5. The conveying or packer fingers 3 of this packing mechanism which are moved by a revolving crank 1 and controlled by pivotable arms 2 are adapted to push the harvest material, which has been fed to them by a cross conveyer according to the invention, into the baling chamber 5 through an inlet opening 4 in the side wall thereof and in front of the baling plunger P which reciprocates within this chamber. In order to permit such movement of the packer fingers 3 into and out of the baling chamber 5, the upper wall of the latter is provided with slots 6 which are open at the end facing toward the cross conveyer. During their conveying stroke, fingers 3 then enter into these slots 6 at the open end thereof and are withdrawn therefrom upwardly at the beginning of the return stroke which proceeds along a curved path C above the upper wall of the baling chamber.

According to the first embodiment of the invention, as illustrated in FIGURES 1 to 3, the cross conveyer consists of a pair of fingers 8 which are mounted on a shaft 7 and constantly revolve in the same direction as indicated by the arrow X. During their conveying stroke, these fingers 8 pass through slots 9 in a cover wall 12 above a receiving table 10 upon which the pick-up mechanism 11 deposits the harvest material after picking it up from the ground. Fingers 8 then sweep over the receiving table 10 and push the material in a pile along the same in the direction toward the inlet opening 4 of baling chamber 5.

Fingers 8 of the cross conveyer always move within the plane of movement of the packer fingers 3 or within a plane parallel thereto. They can therefore be driven in a very simple manner by an endless belt or chain 14 connecting the shaft 13 of crank 1 with their own shaft 7, and either at the same speed as that of crank 1 or at a different speed by providing a suitable transmission ratio between the sprocket wheels or pulleys on shafts 7 and 13 or by providing a suitable gear transmission to adjust the speed of the conveying fingers on shaft 7. Thus, both shafts 7 and 13 are driven through a chain gear 14′ by a main drive shaft D which, in turn, is driven by the drive shaft of plunger P, for example, by means of a universal-joint shaft U.

At the end of the conveying stroke of the revolving fingers 8, wall 12 covering the receiving table 10 holds back the material lying in front of the fingers and strips it off therefrom before the fingers pass upwardly through the slots 9 in wall 12.

If the power transmitting means between drive shaft D and shafts 13 and 7 consist of chains 14 and 14', it is possible to adapt the speed of revolution of the packer fingers 3 to the cycle of movement of plunger P, and also the speed of revolution of the conveying fingers 8 of the cross cronveyer to the speed of fingers 3 so that at the beginning of their conveying stroke the latter will strip the material off the conveying fingers 8, that is, at a time when these fingers 8 complete their conveying stroke. Fingers 3 may carry out such stripping action either alone or in addition to and in cooperation with the stripping action by the slotted wall 12. The fingers of the cross conveyer thus hand over the material to the fingers of the packing mechanism which then convey it further into the baling channel in a timed sequence with the reciprocatory movement of the baling plunger.

The modification of the invention as illustrated in FIGURES 4 to 6 differs from the embodiment according to FIGURES 1 to 3 by the provision of two sets of conveying fingers 8' and 28 which are mounted at an angle of 180° to each other on a common shaft 27 which in this case may be driven at only one-half of the speed of crank shaft 13. This may be attained by making the sprocket wheels 30 and 31 on shafts 27 and 13, which are connected by a chain 32, of a suitable diameter relative to each other.

When using such different speeds, each set of conveying fingers 8' and 28 of the cross conveyer according to FIGURES 4 to 6 will remain twice as long within the area of the packer fingers 3 than the conveying fingers 8 of the cross conveyer according to FIGURES 1 to 3. Consequently, when using a chain drive 32 between shafts 13 and 27, the packer fingers 3 will have twice the length of time to strip the material off the conveying fingers 8' and 28 and will therefore do this very efficiently and completely.

In order to insure that the conveying fingers 8 of the cross conveyer in FIGURES 1 to 3, and 8' and 28 in FIGURES 4 to 6 will pick up all of the harvest material lying on the receiving table 10, the latter is provided with suitable slots or grooves 20 within the plane of movement of the fingers, and the conveying fingers are made of such a length that their free ends, when passing the lowest point of their circular path, penetrate slightly into these grooves or slots 20.

A further advantage of the invention consists in the fact that the constantly revolving fingers 8 or 8' and 28 of the cross conveyer may be secured directly to their shaft 7 or 27, respectively. Therefore, they do not need to be specially controlled to effect a proper stripping action, but only act upon the loosely deposited material on the receiving table without having to overcome any considerable resistance which otherwise would have to be compensated by special control means. By making the forward or conveying edge of fingers 8 or 8' and 28 of a convex shape or by making the covering wall 12 over the receiving table 10 of a downwardly convex shape, or by applying both features at the same time, it is possible to increase the stripping effect of the respective stripping elements since the material cannot remain between the covering wall 12 and fingers 8 or 8' and 28 when the latter at the end of their conveying stroke move upwardly through the slots in the covering wall 12.

In the first two embodiments of the invention, as illustrated in FIGURES 1 and 4, the conveying edges 8a of fingers 8, 8' and 28 of the cross conveyer and a section of the covering wall 12 over the receiving table 10 have such a convex curvature that these parts, when moving relative to each other, form such a large angle that the harvest material cannot become wedged between the conveying edge 8a of the fingers and the curved section 12a of covering wall 12.

Similar advantages will be attained by the use of the cross conveyer according to the modification of the invention as illustrated in FIG. 7. This conveyer consists of an endless belt or chain 15 which is disposed above the cover wall 12 and carries one or more conveying fingers 16 or one or more sets of such fingers which during the conveying stroke pass through slots 9 in cover wall 12 into the harvest material lying on the receiving table 10. This cross conveyer is mounted above cover wall 12 so as to extend diagonally thereto, and its conveying fingers 16 also move within the same planes as the packer fingers 3 or parallel thereto. Consequently, the pulley or sprocket wheel 15a adjacent to crankshaft 13 of the packing mechanism may be driven directly by this crankshaft by means of a belt or chain 24 and either at the same speed as that of the crankshaft or at a different speed. The inclined position of the endless conveyer 15 in co-operation with a suitable shape of the conveying fingers 16 thereon result in such an angular position of the latter relative to the cover wall 12 that the harvest material will not be wedged between the fingers and that wall even though the latter extends in a straight direction parallel to the receiving table 10, as shown in dotted lines at 10a in FIG. 7.

The stripping effect may, however, be further improved by curving a portion 12b of cover wall 12 upwardly so that a still more favorable stripping angle will be attained between this wall portion and conveying fingers 16.

By bending a wall portion 12a in FIGURES 1 and 4 or 12b in FIG. 7 upwardly, the chamber which is formed by the receiving table 10, its lateral walls 18 and 19 and cover wall 12 for receiving and collecting the harvest material from the pick-up mechanism will also be increased in size. This constitutes another advantage since during the time while the cross conveyer pushes the material in the direction toward the lateral inlet opening 4 of baling chamber 5, it is possible for the pick-up mechanism 11 to continue feeding additional material into the pile in a direction transverse to the movement of the cross conveyer and at a point in front of the conveying fingers 8, 8', 28, or 16", respectively.

If the cover wall 12 would extend entirely parallel to the receiving table 10, the resistance by the pile of harvest material, which increases in size from two directions, would also increase, which would require that the cross conveyer would have to be made of a greater solidity and strength. This, however, will not be necessary if the cover wall 12 is bent upwardly so that the chamber above the receiving table 10 increases in size in accordance with the increase in volume of the pile of harvest material which is pushed together by the cross conveyer and to which additional material is continuously added by the pick-up mechanism. The desired preliminary compression of the material will then occur solely within a subsequent gradually reducing section of this collecting chamber closely in front of the inlet opening 4 of baling chamber 5 and by means of the packer fingers 3 which in any event must be made of a more solid construction to effect a strong preliminary compression of the harvest material.

In the event that the packer fingers 3 should not be required for stripping the harvest material off the conveying fingers of the cross conveyer, the positive drive by means of a chain between crankshaft 13 of the packer fingers 3 and the shaft carrying the conveying fingers 8, 8' and 28, or 16 of the cross conveyer may be replaced by a belt drive, and any suitable transmission ratio may then also be applied between the two shafts. Such a belt drive has the advantage that, if fingers 8, 8', 28, or 16 should hit upon a solid object within the harvest material or upon a solid pile thereof, the elastic material of the belt will permit the fingers to bend backwardly and to pass the obstruction without breaking. If the resistance caused by such an obstruction should be very great, the driving belt may also slip on its driving and driven pulleys.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In a baler having housing means, a generally horizontal receiving table disposed in said housing means, crop pick-up means along a forward edge of said table for depositing thereon crop material picked up from the ground, and a baling chamber having an inlet opening adjacent said table, in combination, packing means for delivering crop material into said chamber through said opening, said packing means comprising a crankshaft journaled in said housing above said table, a crank secured to said crankshaft, and at least one packing finger pivotally connected to said crank for displacement in a closed, generally kidney-shaped path along the surface of said receiving table and through said inlet opening; cross-conveying means for delivering crop material deposited on said table to said packing means, said cross-conveying means comprising a driven shaft spaced from said crankshaft and journaled in said housing substantially parallel thereto, and at least one conveying finger rigidly secured to said driven shaft and extending radially therefrom for displacement in a circular path offset from said kidney-shaped path; and drive means for rotating said crankshaft and said driven shaft, said housing means including a wall portion above said table and below said shafts forming with said table a receiving compartment having an enlarged intermediate portion between said packing means and said cross-conveyor means.

2. In a baler having housing means, a generally horizontal receiving table disposed in said housing means, crop pick-up means along a forward edge of said table for depositing thereon crop material picked up from the ground, and a baling chamber having an inlet opening adjacent said table, in combination, packing means for delivering crop material into said chamber through said opening, said packing means comprising a crankshaft journaled in said housing above said table, a crank secured to said crankshaft, and at least one packing finger pivotally connected to said crank for displacement in a closed, generally kidney-shaped path along the surface of said receiving table and through said inlet opening; cross-conveying means for delivering crop material deposited on said table to said packing means, said cross-conveying means comprising a driven shaft spaced from said crankshaft and journaled in said housing substantially parallel thereto, and at least one conveying finger rigidly secured to said driven shaft and extending radially therefrom for displacement in a circular path adjacent said kidney-shaped path; stripping means for removing crop material from said conveying finger at a location adjacent said kidney-shaped path; and drive means for rotating said crankshaft and said driven shaft, said stripping means including a wall portion of said housing above said table and below said shafts forming with said table a receiving compartment having an enlarged intermediate portion between said packing means and said cross-conveyor means, said wall portion being provided with slits for said fingers.

3. The combination according to claim 2 wherein said cross-conveying means comprises two pairs of angularly aligned radial conveying fingers secured to said driven shaft at angularly offset locations.

4. The combination according to claim 2 wherein said conveying finger is provided with a smoothly curved, outwardly convex working edge in the direction of rotation of said conveying finger.

5. In a baler having housing means, a generally horizontal receiving table disposed in said housing means, crop pick-up means along a forward edge of said table for depositing thereon crop material picked up from the ground, and a baling chamber having an inlet opening adjacent said table, in combination, packing means for delivering crop material into said chamber through said opening, said packing means comprising a crankshaft journaled in said housing above said table, a crank secured to said crankshaft, and at least one packing finger pivotally connected to said crank for displacement in a closed, generally kidney-shaped path along the surface of said receiving table and through said inlet opening; cross-conveying means for delivering crop material deposited on said table to said packing means, said cross-conveying means comprising a driven shaft spaced from said crankshaft and journaled in said housing substantially parallel thereto, and at least one pair of conveying fingers rigidly secured to said driven shaft and extending radially therefrom in angular alignment for displacement in a circular path adjacent said kidney-shaped path; stripping means for removing crop material from said conveying fingers at a location adjacent said kidney-shaped path; and drive means for rotating said crankshaft and said driven shaft, said stripping means including a wall portion of said housing above said table and below said shafts forming with said table a receiving compartment gradually diverging from said opening toward an enlarged intermediate portion between said packing means and said cross-conveyor means, and thereafter converging again toward said cross-conveyor means, said wall portion being provided with slits for each of said fingers.

6. In a baler having housing means, a generally horizontal receiving table disposed in said housing means, crop pick-up means along a forward edge of said table for depositing thereon crop material picked up from the ground, and a baling chamber having an inlet opening adjacent said table, in combination, packing means for delivering crop material into said chamber through said opening, said packing means comprising a crankshaft journaled in said housing above said table, a crank secured to said crankshaft, and at least one packing finger pivotally connected to said crank for displacement in a closed, generally kidney-shaped path along the surface of said receiving table and through said inlet opening; cross-conveying means for delivering crop material deposited on said table to said packing means, said cross-conveying means comprising a driven shaft spaced from said crankshaft and journaled in said housing substantially parallel thereto, and at least one conveying finger rigidly secured to said driven shaft and extending radially therefrom for displacement in a circular path offset from said kidney-shaped path; and drive means for rotating said crankshaft and said driven shaft in a predetermined relationship whereby said packing finger commences its travel along said table when said conveying finger completes its travel thereacross.

7. In a baler having housing means, a generally horizontal receiving table disposed in said housing means, crop pick-up means along a forward edge of said table for depositing thereon crop material picked up from the ground, and a baling chamber having an inlet opening adjacent said table, in combination, packing means for delivering crop material into said chamber through said opening, said packing means comprising a crankshaft journaled in said housing above said table, a crank secured to said crankshaft, and at least one packing finger pivotally connected to said crank for displacement in a closed, generally kidney-shaped path along the surface of said receiving table and through said inlet opening; cross-conveying means for delivering crop material deposited on said table to said packing means, said cross-conveying means comprising a driven shaft spaced from said crankshaft and journaled in said housing substantially parallel thereto, and at least one pair of conveying fingers rigidly secured to said driven shaft and extending radially therefrom in angular alignment for displacement in a circular path offset from said kidney-shaped path; and drive means for rotating said crankshaft and said driven shaft, said housing means including a wall portion above said table and below said shafts forming with said table a receiving compartment gradually diverging from said opening toward an enlarged intermediate portion between said packing means and said cross-conveyor means and thereafter converging again toward said cross-conveyor means.

References Cited in the file of this patent

UNITED STATES PATENTS

| | | |
|---|---|---|
| 1,454,668 | Bugla | May 8, 1923 |
| 2,038,809 | Tallman et al. | Apr. 28, 1936 |
| 2,450,082 | Crumb et al. | Sept. 28, 1948 |
| 2,497,641 | Vutz | Feb. 14, 1950 |
| 2,572,180 | Morrison | Oct. 23, 1951 |
| 2,725,009 | Bornzin | Nov. 29, 1955 |
| 2,760,625 | Lohnert | Aug. 28, 1956 |
| 2,862,347 | Nelson | Dec. 2, 1958 |

FOREIGN PATENTS

| | | |
|---|---|---|
| 741,233 | Great Britain | Nov. 30, 1955 |
| 957,534 | Germany | Feb. 7, 1957 |